(12) United States Patent
Ruehle

(10) Patent No.: US 6,755,881 B2
(45) Date of Patent: Jun. 29, 2004

(54) RACE ENGINE AIR CLEANER HOUSING

(75) Inventor: Edward A. Ruehle, Plymouth, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 113 days.

(21) Appl. No.: 10/077,515

(22) Filed: Feb. 15, 2002

(65) Prior Publication Data
US 2003/0163980 A1 Sep. 4, 2003

(51) Int. Cl.[7] ............................................. B01D 46/02
(52) U.S. Cl. ....................... 55/498; 55/385.3; 55/502; 55/510; 55/DIG. 28; 123/198 E
(58) Field of Search .................. 55/385.3, 497, 55/498, 502, 510, DIG. 28; 123/198 E

(56) References Cited

U.S. PATENT DOCUMENTS

| 2,973,832 | A | * | 3/1961 | Cook et al. .................... 55/498 |
| 2,996,145 | A | | 8/1961 | Thornburgh |
| 3,212,242 | A | | 10/1965 | Florine |
| 3,277,876 | A | | 10/1966 | Abts |
| 3,347,028 | A | | 10/1967 | Erbstoesser |
| 3,355,863 | A | * | 12/1967 | Pittsley ......................... 55/510 |
| 3,417,551 | A | * | 12/1968 | Bonell .......................... 55/498 |
| 3,450,117 | A | * | 6/1969 | McHattie et al. ............. 55/510 |
| 3,563,010 | A | | 2/1971 | Wheatley |
| 3,589,108 | A | | 6/1971 | Dingel et al. |
| 3,619,900 | A | * | 11/1971 | Gayda ................... 55/DIG. 28 |
| 3,710,560 | A | * | 1/1973 | Maddocks .................... 55/510 |
| 3,747,303 | A | * | 7/1973 | Jordan ......................... 55/498 |
| 3,807,144 | A | | 4/1974 | Graybill |
| 3,849,093 | A | * | 11/1974 | Konishi et al. ............. 55/385.3 |
| 4,071,004 | A | * | 1/1978 | Ostergaard .................... 55/510 |
| 4,162,660 | A | * | 7/1979 | Albertson et al. ...... 55/DIG. 28 |
| 4,224,044 | A | * | 9/1980 | King ............................. 55/510 |
| 5,447,546 | A | | 9/1995 | Thibodeau |
| 5,549,085 | A | | 8/1996 | Endrigo |
| 5,685,887 | A | | 11/1997 | Mochida |
| 5,873,920 | A | | 2/1999 | Wong et al. |
| 5,901,681 | A | | 5/1999 | Mueller |

OTHER PUBLICATIONS

Moroso Inc., Internet Catalog, Race/Street Air Cleaners, http://www.moroso.com, Mar. 6, 2001.
Moroso Inc., Internet Catalog, Offset Air Cleaners, http://www.moroso.com, Mar. 6, 2001.
Moroso Inc., Internet Catalog, Flat Bottom Racing Air Cleaners, http://www.moroso.com, Mar. 6, 2001.
Moroso Inc., Internet Catalog, Low Profile Racing Air Cleaners, http://www.moroso.com, Mar. 6, 2001.

* cited by examiner

*Primary Examiner*—Duane Smith
*Assistant Examiner*—Jason M. Greene
(74) *Attorney, Agent, or Firm*—Edwin W. Bacon, Jr.

(57) ABSTRACT

An air cleaner housing for holding a cylindrical filter element and providing a laminar flow of air to a carburetor of an engine. The housing has a bottom plate with an outer peripheral portion and a venturi section radially inward of the outer peripheral portion. A top cover of the housing has a convex section radially inward of a top peripheral portion. The convex section of the top cover is at least partially positioned over the bottom venturi section of the bottom plate.

3 Claims, 2 Drawing Sheets

RACE ENGINE AIR CLEANER HOUSING

This invention relates generally to air cleaners for internal combustion engines and more particularly to an air cleaner housing for directing air flow from an air filter into a fuel/air mixing chamber of the engine.

BACKGROUND OF THE INVENTION

Internal combustion engines employ air filters to remove unwanted particulates from the combustion air stream before it enters the engine. Typically, a cylindrical air filter is mounted in an air cleaner housing. Air is drawn radially inwardly through the air filter. The air stream has a tendency to churn turbulently as it approaches the center of the filter housing before it is drawn downwardly into the carburetor beneath the air cleaner. Various attempts have been made to improve the efficiency of the air cleaner by smoothing out the air flow to avoid turbulence and thereby minimize pressure drop of the air stream as it flows through the air cleaner, but without much success.

SUMMARY OF THE INVENTION

The air cleaner of the present invention employs a housing which is specially designed to improve the efficiency of the fuel/air mixture in the carburetor by smoothing out the flow of air into a laminar flow path to avoid turbulence and reduce pressure drop before the air enters the carburetor.

Accordingly another aspect of the invention is to provide an air cleaner housing designed to smooth out the air flow path and reduce pressure drop after the air leaves the filter and before it moves into the combustion chamber.

Yet another aspect of the invention is to provide an air cleaner housing designed to smooth out the air flow path and thereby equalize the temperature of all spark plugs in an internal combustion engine.

Yet one more aspect of the invention is to provide an air cleaner housing designed to eliminate turbulence in the carburetor thereby improving the stability of the air/fuel ratio and charge distribution to each cylinder of the engine.

Other objects, features and advantages of the invention will become more apparent as the following description proceeds, especially when considered with the accompanying drawing.

DETAILED DESCRIPTION OF THE PREFERRED EMBODIMENT

Figure 1:
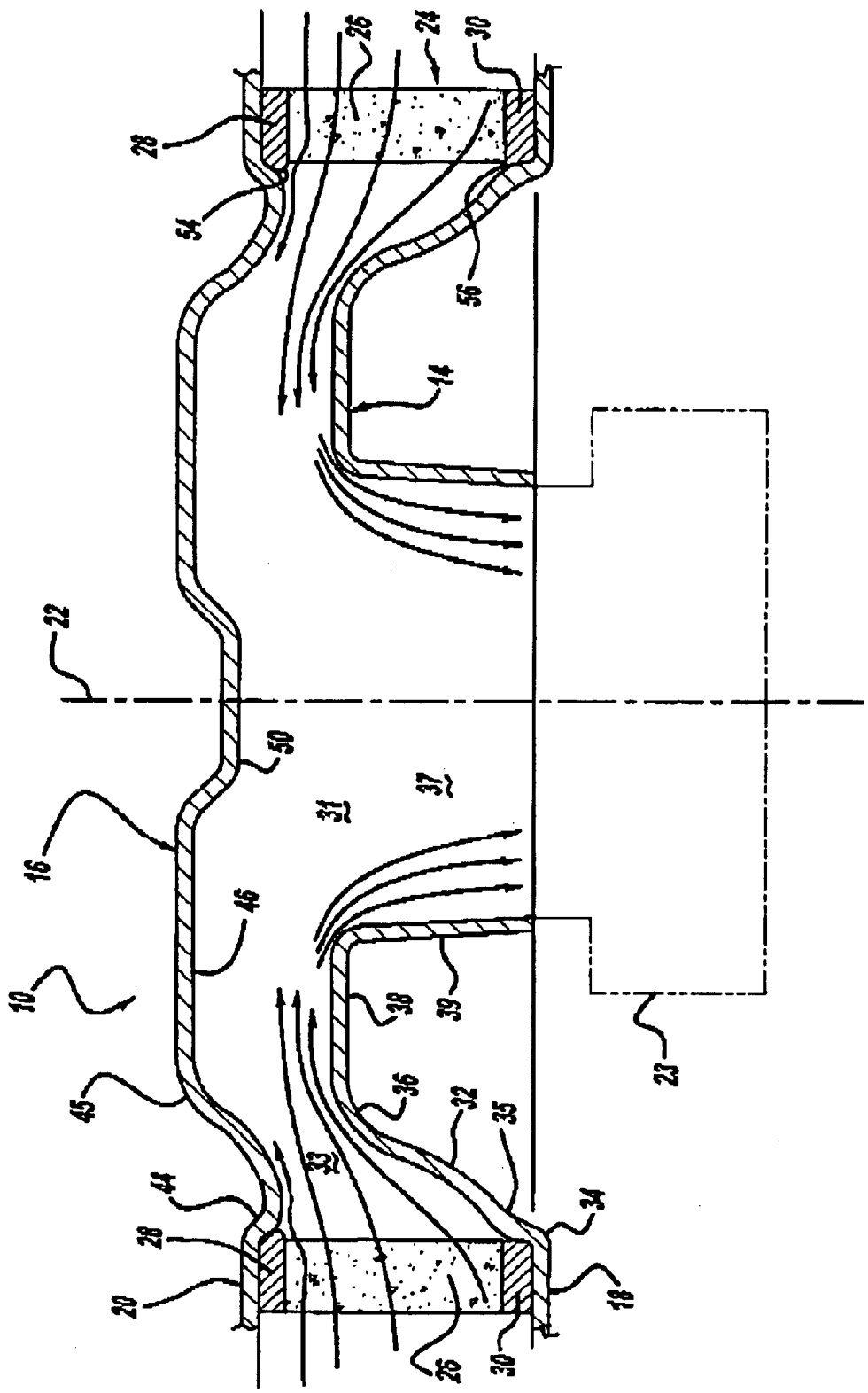
FIG. 1 is a vertical sectional view of an air cleaner constructed in accordance with the invention.

Referring now more particularly to FIG. 1, an air cleaner housing 10 is shown having a bottom plate 14 and a top cover 16 spaced vertically above the bottom plate 14.

The bottom plate 14 has a radially outer peripheral portion 18. The top cover 16 has a radially outer peripheral portion 20 spaced directly above the peripheral portion 18 of the bottom plate. The peripheral portions 18 and 20 are generally flat, parallel, and perpendicular to the longitudinal centerline 22 of the housing. The longitudinal centerline 22 is generally vertical when the housing is mounted over the carburetor 23 of the engine.

A cylindrical filter element 24 is disposed between the peripheral portions 18 and 20 of the bottom plate 14 and the top cover 16. The filter element 24 has an annular body 26 of filter material capable of filtering out particulate matter from air drawn radially inwardly through the filter material. Attached to the top and bottom surfaces of the body 26 of filter material are sealing rings 28 and 30. The sealing rings 28 and 30 are compressed against the peripheral portions 18 and 20 of the bottom plate 14 and the top cover 16. The convex section 35 near point 34 is shaped to beneficially deform the radially inward portion of sealing ring 30 in such a manner as to preserve laminar flow of air in chamber 31 in the immediate proximity of the sealing ring 30. The radially inward portion of sealing ring 28 is also beneficially deformed by convex section 44 of top cover 16. The chamber 31, which passes filtered air entering the chamber through the filter element annular body 26, is defined by bottom plate 14, top cover 16, and sealing rings 28 and 30.

The contour of the bottom plate 14 is as shown in the radial section in FIG. 1. Desirably the contour of the bottom plate is constant and unchanging throughout its full circumferential extent. However, some discontinuities in the contour of bottom plate 14 may be added to accommodate passages for allowing gasses other than filtered air, such as crankcase ventilation gas, into the chamber 31. From its radially outer peripheral portion 18, and extending radially inwardly therefrom, the contour of the bottom plate 14 has a convex section 35 which, as already discussed, operates to beneficially deform the radially inward portion of sealing ring 30. Radially inward from the convex section 35 is a concave section 32 which operates to direct filtered air towards a venturi 33 of the chamber 31. Radially inward from the concave section 32 is a bottom venturi section 36 that forms the lower portion of venturi 33. Further radially inward of bottom venturi section 36 is planar section 38. At its radially inner extremity, the section 38 is bent downwardly to provide an annular wall 39, thereby forming a bell outlet 37. Filtered air flows from the bell outlet 37 into the carburetor 23. In one aspect of the invention, the annular wall 39 of the bell outlet 37 is substantially parallel to the longitudinal centerline 22. The contour of the bottom plate 14 will be defined with greater particularity later in this description.

The contour of the top cover 16 is as shown in radial section in FIG. 1. The contour of the top plate is constant and unchanging throughout its full circumferential extent. From its radially outer peripheral portion 20, and extending radially inwardly therefrom, the contour of the top cover has a convex section 44. The radially outer portion of convex section 44 operates to beneficially distort the sealing ring 28. The remainder of convex section 44 is located above the bottom sections 32, 36 and cooperates with section 36 to form venturi 33. Radially inward of convex section 44 is a concave section 45. Further radially inward of concave section 45 is planar section 46 that cooperates with planar section 38 of the bottom plate to lead filtered air radially inwards toward the bell outlet 37. A depression 50 is formed at the most radially inward area of the planar section 46. The depression 50 operates to assist in directing laminar air flow into the bell outlet 37. The depression 50 is generally cup-shaped having a flat bottom wall which is perpendicular to the longitudinal center line 22 of the housing, and outwardly flaring and upwardly curved side walls that merge into the section 46.

The convex sections 35 and 44 cooperate to positively locate the filter element 24 in the housing 10. In developing this invention, it was discovered that even slight distortions in the position of the filter element 24, such as might occur during a vehicle race, are undesirable. Such distortions operate to generate turbulent airflow and unevenly distribute airflow within the carburetor. Convex sections 35 and 44 effectively eliminate filter element 24 distortions.

Figure 2:
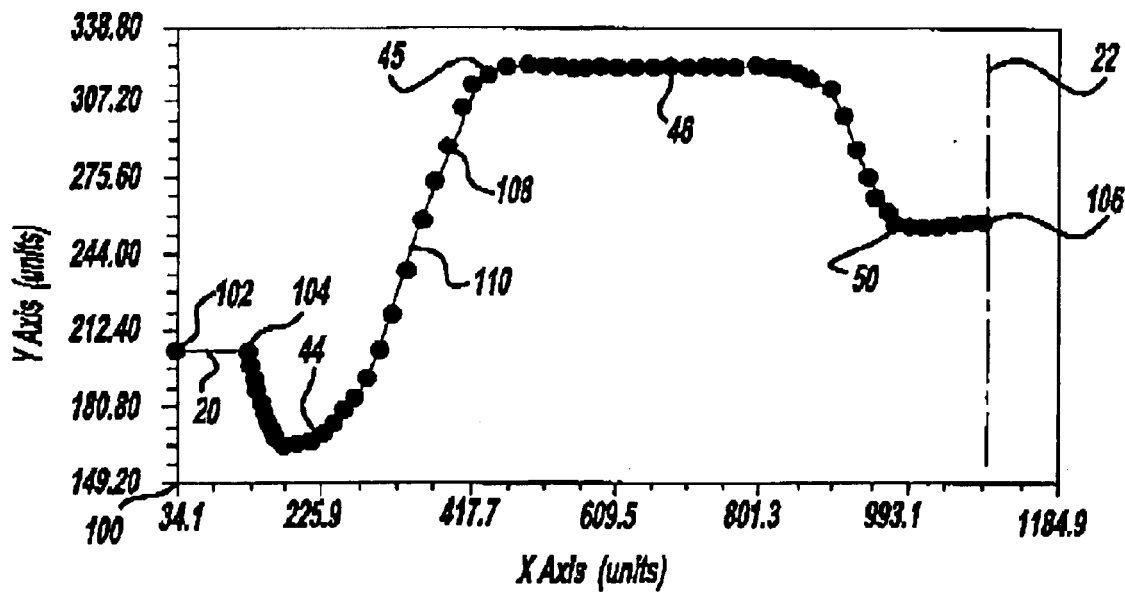
FIG. 2 is a graph of points plotted to calculate the contour of the top cover.
Figure 3:
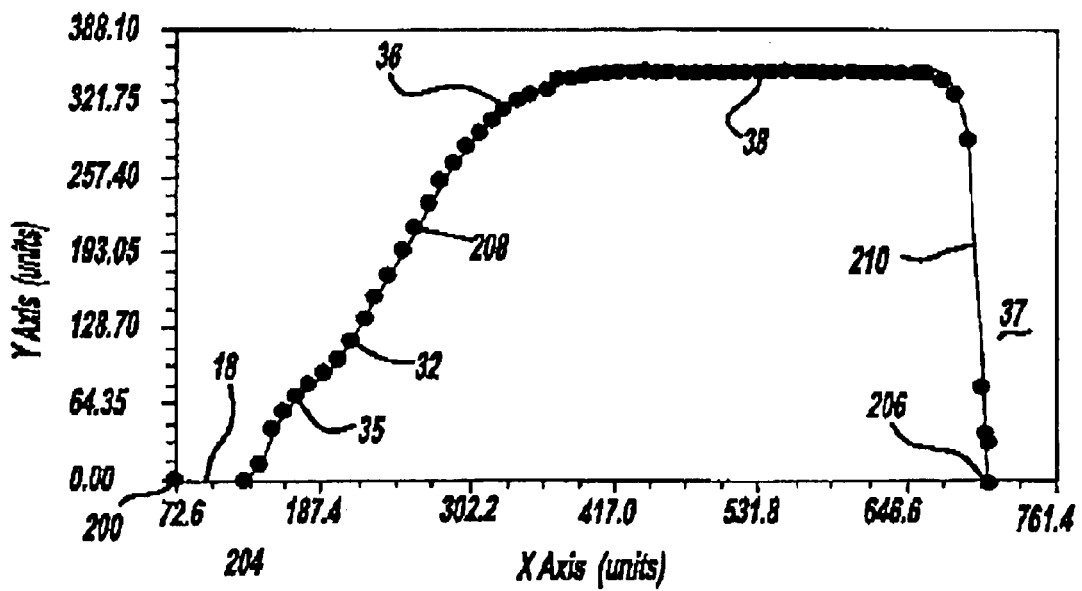
FIG. 3 is a graph of points plotted to calculate the contour of the bottom plate.

The aforementioned section by section description of contours may also be described mathematically. FIGS. 2 and 3 show x,y coordinate grids plotting representative points of the top cover 16 and bottom plate 14, respectively.

Plotted on the x,y grid of FIG. 2 are a series of data points 108 that represent a sample of the contour of the top cover 16 as described above. The line segment beginning at endpoint 104 and extending through point 102 represents the radially outer peripheral portion 20. The segment may be dimensioned to satisfactorily mate with sealing ring 28. Also plotted on the x,y grid of of FIG. 2 is the longitudinal centerline 22. The contoured surface of the top cover begins at endpoint 104 having coordinates (130,203) and extends to endpoint 106 having coordinates (1089,257). The longitudinal centerline 22 intersects endpoint 106. Points 108 between endpoints 104 and 106 lie approximately along line 110 characterized by an n-th order polynomial equation.

For this application, a 19-th order polynomial is preferred for describing line 110. The 19-th order polynomial expands to the following equation: $y = a_0 x^0 + a_1 x^1 + a_2 x^2 + a_3 x^3 + a_4 x^4 + a_5 x^5 + a_6 x^6 + a_7 x^7 + a_8 x^8 + a_9 x^9 + a_{10} x^{10} + a_{11} x^{11} + a_{12} x^{12} + a_{13} x^{13} + a_{14} x^{14} + a_{15} x^{15} + a_{16} x^{16} + a_{17} x^{17} + a_{18} x^{18} + a_{19} x^{19}$, where $a_0$–$a_{19}$ are constants, x is a known independent value, and y is an unknown dependent value. This polynomial equation, can be simplified to the following formula:

$$y = \sum_{i=0}^{n} a_i x^i$$

where y equals the sum of each $a_i x^i$ for i from 0 to n. The preferred equation is simplified to:

$$y = \sum_{i=0}^{19} a_i x^i$$

where y equals the sum of each $a_i x^i$ for i from 0 to 19. The preferred 19-th order polynomial for the line 110 has constants $a_i$ according to Table 1.

TABLE 1

| Constant | Value |
| --- | --- |
| $a_0$ | 4985.318 |
| $a_1$ | −121.16523 |
| $a_2$ | 1.2687824 |
| $a_3$ | −0.0070787996 |
| $a_4$ | 2.2003603e−05 |
| $a_5$ | −3.3993253e−08 |
| $a_6$ | 6.3768494e−12 |
| $a_7$ | 5.5080608e−14 |
| $a_8$ | −5.2974058e−17 |
| $a_9$ | −3.3657906e−20 |
| $a_{10}$ | 4.6965338e−23 |
| $a_{11}$ | 4.2960913e−26 |
| $a_{12}$ | −5.4097746e−29 |
| $a_{13}$ | −2.0260889e−33 |
| $a_{14}$ | −2.4257828e−35 |
| $a_{15}$ | 5.4669649e−38 |
| $a_{16}$ | 2.8181943e−42 |
| $a_{17}$ | −4.7997388e−44 |

TABLE 1-continued

| Constant | Value |
| --- | --- |
| $a_{18}$ | 2.9677608e−47 |
| $a_{19}$ | −5.6220424e−51 |

Plotted on the x,y grid of FIG. 3 are a series of data points 208 that represent a sample of the contour of the bottom plate 14 as described earlier. The line segment beginning at endpoint 204 and extending through point 200 represents the radially outer peripheral portion 18. The segment may be dimensioned to satisfactorily mate with sealing ring 30. The contoured surface of the bottom plate begins at point 204 having coordinates (130,2) and extends to point 206 having coordinates (704,0). The stated coordinates for the top cover 16 and the bottom plate 14 are unitless however have the same step size. The points 208 between endpoints 204 and 206 lie approximately along line 210 characterized again by an n-th order polynomial equation. The 19-th order polynomial for the line 210 has constants $a_i$ according to Table 2.

TABLE 2

| Constant | Value |
| --- | --- |
| $a_0$ | 2620.4992 |
| $a_1$ | 45.913873 |
| $a_2$ | −0.21901161 |
| $a_3$ | −0.00045293099 |
| $a_4$ | 6.7593113e−06 |
| $a_5$ | −1.4810913e−08 |
| $a_6$ | −1.5518953e−11 |
| $a_7$ | 5.1485580e−14 |
| $a_8$ | 1.8065552e−16 |
| $a_9$ | −6.7639749e−19 |
| $a_{10}$ | 7.6235633e−22 |
| $a_{11}$ | −4.0256246e−25 |
| $a_{12}$ | −4.2226965e−28 |
| $a_{13}$ | 2.1623292e−30 |
| $a_{14}$ | −8.7313950e−34 |
| $a_{15}$ | −1.9974521e−36 |
| $a_{16}$ | −8.5239903e−39 |
| $a_{17}$ | 2.5790067e−41 |
| $a_{18}$ | −2.2620790e−44 |
| $a_{19}$ | 6.5431482e−48 |

It is well known, by those skilled in the art, that given a polynomial equation, the independent x-values, and the corresponding constants, the polynomial equation will calculate the y-values. Each point will have a unique x,y pair and a number of such points will describe a resulting polynomial line. The line can then represent an approximation of the contours of a surfaces, such as lines 110 and 210 represent an approximation of the contours of the top cover 16 and bottom plate 14, respectively. The x,y pairs resulting from applying the constants in Tables 1 and 2 may also be scaled, as is known in the art, to change the x and y dimensions of the polynomial line. This scaling may be necessary to fit the invention to a particular filter element 24 and carburetor 23.

The arrows in FIG. 1 represent the smooth laminar flow of air passing through the air cleaner housing 10 as a result of the configuration of the bottom plate 14 and top cover 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner housing for holding a cylindrical filter element and providing a laminar flow of air to a carburetor of a vehicle engine, said housing comprising:

a bottom plate having an outer peripheral portion;

a top cover spaced above said bottom plate, said top cover having a top peripheral portion above the outer peripheral portion of the bottom plate;

said bottom plate, top cover and the cylindrical filter element defining a chamber for filtered air entering said chamber through the cylindrical filter element;

said bottom plate having a convex section radially inward of said outer peripheral portion, a concave section transitioning from said convex section to a bottom venturi section, a planar section radially inward of said bottom venturi section, and an annular wall radially inward from said planar section and extending away from said top cover; said top cover having a convex section radially inward of said too peripheral portion, a concave section radially inward of said convex section, and a planar section radially inward of said concave section, where said convex section is at least partially positioned over said bottom venturi section of said bottom plate.

2. The housing of claim 1, said top cover additionally comprising a depression radially inward of said convex section; and said depression being positioned over an outlet defined by said annular well of said bottom plate.

3. An air cleaner housing for holding a cylindrical filter element and providing a laminar flow of air to a carburetor of a vehicle engine, said housing comprising:

a bottom plate having an outer peripheral portion;

a top cover spaced above said bottom plate, said top cover having a top peripheral portion above the outer peripheral portion of the bottom plate;

said bottom plate, top cover and the cylindrical filter element defining a chamber for filtered air entering said chamber through the cylindrical filter element;

said bottom plate having a contour extending radially inward from said outer peripheral portion, said contour being generally along a line characterized by a first equation $$y_1 = \sum_{i=0}^{n} a_i x_1^i$$

wherein $x_1$ is an independent variable on the interval 130 to 704;

$y_1$ is a variable dependent upon $x_1$;

$a_1$ is a constant taken from the set of
$a_0$=2620.4992;
$a_1$=45.913873;
$a_2$=−0.21901161;
$a_3$=−0.00045293099;
$a_4$=6.7593113e-06;
$a_5$=−1.4810913e-08;
$a_6$=−1.5518953e-11;
$a_7$=5.1485580e-14;
$a_8$=1.8065552e-16;
$a_9$=6.7639749e-19;
$a_{10}$==7.6235833e-22;
$a_{11}$=−4.0258246e-25;
$a_{12}$=−4.2226965e-28;
$a_{13}$=2.1623292e-30;
$a_{14}$=8.7313950e-34;
$a_{15}$=−1.9974521e-36;
$a_{16}$=−8.5239903e-39;
$a_{17}$=2.5790067e-41;
$a_{18}$=−2.2620790e-44;
$a_{19}$=6.5431482e-48;

said top cover having a contour extending radially inward from said top peripheral portion, said contour being generally defined along a line characterized by a second equation $$y_2 = \sum_{i=0}^{n} b_i x_2^i$$

wherein $x_2$ is an independent variable on the interval 130 to 1089;

$y_2$ is a variable dependent upon $x_2$;

$b_1$ is a constant taken from the set of
$b_0$=4985.318;
$b_1$=−121.16523;
$b_2$=−1.2687824;
$b_3$-00.0070787996;
$b_4$=2.2003803e-05;
$b_5$=−3.3993253e-08;
$b_6$=6.3768494e-12;
$b_7$=5.5080608e-14;
$b_8$=−5.2974058e-17;
$b_9$=−3.3657908e-20;
$b_{10}$=4.6966338e-23;
$b_{11}$=4.2960913e-26;
$b_{12}$=−5.4097746e-29;
$b_{13}$=−2.0260889e-33;
$b_{14}$=−2.4257828e-35;
$b_{15}$=5.4669649e-38;
$b_{16}$=2.81819443e-42;
$b_{17}$=−4.7997388e-44;
$b_{18}$=2.9677608e-47;
$b_{12}$=−5.6220424e-51; and
n=19.

* * * * *